Jan. 28, 1936.  C. R. BUSCH  2,028,753
BRAKE SHOE KEY
Filed July 14, 1931    2 Sheets-Sheet 1
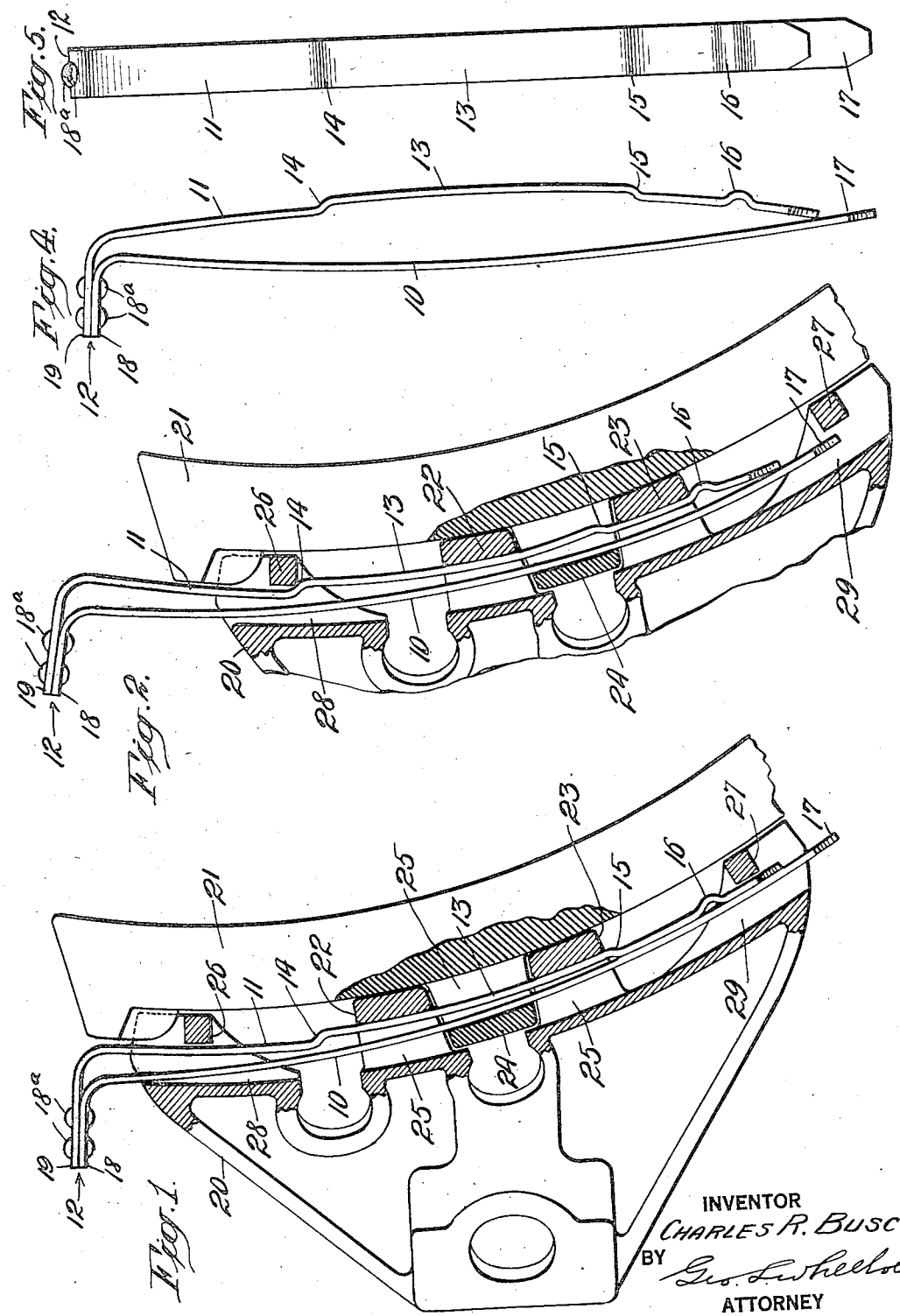

Jan. 28, 1936.  C. R. BUSCH  2,028,753
BRAKE SHOE KEY
Filed July 14, 1931  2 Sheets-Sheet 2
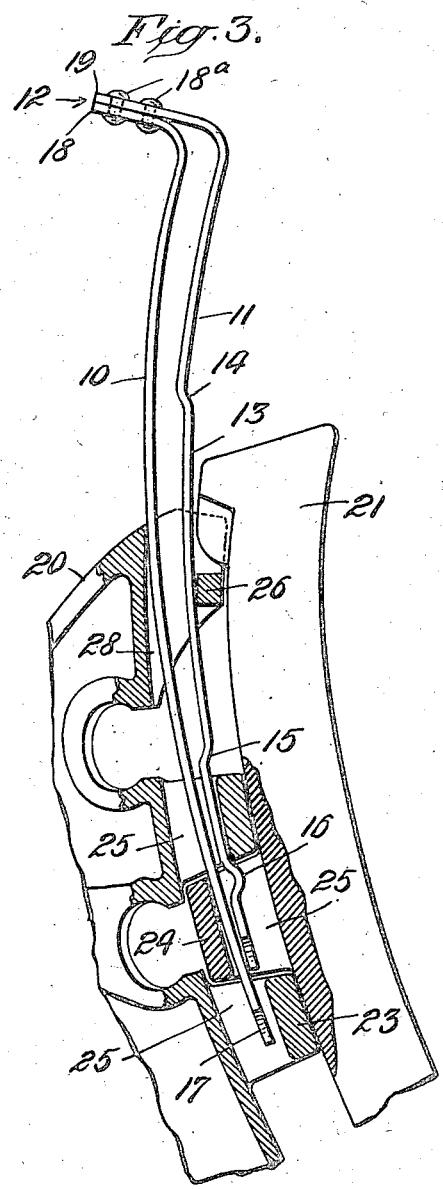
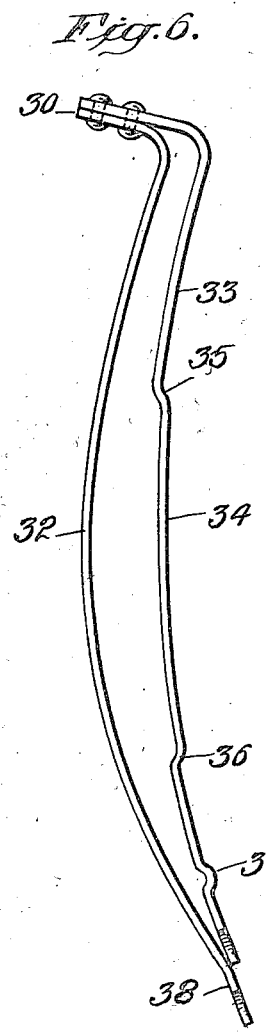
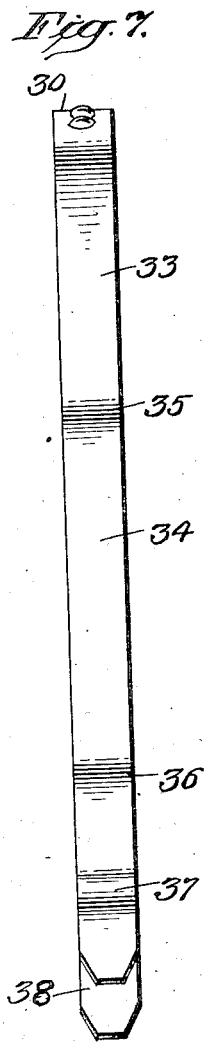
INVENTOR
Charles R. Busch
BY Geo. L. Wheelock
ATTORNEY Patented Jan. 28, 1936

2,028,753

UNITED STATES PATENT OFFICE 2,028,753

BRAKE SHOE KEY

Charles R. Busch, Orange, N. J., assignor to Buffalo Brake Beam Company, New York, N. Y., a corporation of New York Application July 14, 1931, Serial No. 550,661

26 Claims. (Cl. 188—243)

The present invention relates to more or less radical improvements in brake shoe keys of the type wherein a substantially solid lug extends rearwardly of the upper end of the key, away from the face of the brake shoe retained by the key upon the corresponding brake shoe head. While preferably the improved key has a lug of a solid type, the invention is not necessarily restricted thereto. The improvements also include certain incidental improvements in the brake shoe head.

With the usual type of brake shoe key, it has been found in practice that a given key cannot take care of varying conditions in the key-way of the castings through which the key passes, nor compensate for varying conditions due to wear between the brake shoe and head, caused by action of the brakes and vibration between the locked parts. Therefore an important object of the present invention is to provide a non-vibrating and a self-locking key for brake shoes.

Another object of the invention is to provide a key which may be driven into place in the usual manner from its upper end and be withdrawn in the usual manner, the key being preferably of a length to extend clear through the key-way provided therefor, but which key is provided with a pair of legs preferably which are bowed for substantially their entire length and which legs have considerable springiness and resiliency throughout the entire length of the legs, so as to compensate for varying conditions in different key-ways and to take up wear of the locked parts.

Another object of the present invention is to provide a key with a pair of opposed spring legs, one of which has a bearing portion which is deflected in a direction towards the brake shoe when the key is in place, so that the bowed spring legs will act in opposite directions to retain the brake shoe on its head without vibration.

Other objects of the present invention are to provide one of the spring legs of the key with shoulders, so located that the key is prevented from jumping out of place whether the same is driven into the key-way for its entire length or for distances less than such length, so that the improved key has a wide range of adaptability to varying conditions between different brake shoes and their respective heads.

These being among the objects of the present invention, the same consists of certain features of construction and combinations of parts to be hereinafter described and then claimed with reference to the accompanying drawings, illustrating a preferred and a modified construction, and wherein Figure 1 is a side elevation, parts broken away and in section, of a brake shoe and its head held in place by the improved key when driven into the key-way;

Fig. 2 is a similar view showing the key only partly driven into the key-way;

Fig. 3 is also a similar view showing the key driven in for a less distance than in Fig. 2;

Fig. 4 is a side elevation of a preferred construction of brake shoe key;

Fig. 5 is an elevation, taken at right angles to Fig. 4;

Fig. 6 is a side elevation of another construction of key; and

Fig. 7 is an elevation at right angles thereto.

The improved key is preferably composed of two suitable lengths of strip steel which are bent and preferably connected before the same are tempered, after which the steel is tempered so as to provide a pair of legs 10, 11 composed of flat or leaf springs, as shown in Figs. 4 and 5, although the strips may first be connected before bending, if found best. A more or less flattened lug 12 extends from the key rearwardly of the brake shoe held by the key. Legs 10, 11 being broad and preferably of substantially flat leaf spring metal face each other, and are bowed away from each other as shown clearly in Fig. 4. By thus bowing the legs outwardly from each other in the plane they mutually occupy, a considerable space or gap is produced between the legs, for the entire length of the key. Each length of steel is in effect a steel bar and the key comprises such a bar.

As shown in Figs. 4 and 5, the outwardly bowed leg 11 is provided with an intermediate portion 13 which is deflected away from the other leg 10 and extends longitudinally of the leg 11 for more than a third of the length thereof. The outer surface of the deflected portion 13 of the leg 11 forms an extended bearing surface, which has a curve approximating the general curve of the leg 11. The provision of the extended bearing portion 13 incidentally produces, on the outer surface of leg 11, an abrupt shoulder 14 at the upper end of portion 13 and an abrupt shoulder 15 at the lower end thereof. That is to say, the shoulder 14 is located much nearer the lug 12 than is the shoulder 15. When the leg 11 is composed of substantially flat spring metal, the shoulders 14, 15 extend transversely of the leg 11 and are substantially parallel with each other. Between the shoulder 15 and the free end of the leg 11, the leg is formed with an outward corrugation or rib 16 which extends transversely and is substantially parallel with the shoulders before mentioned, constituting an additional abrupt shoulder located adjacent the free end of the leg 11. The shoulder 16 is also deflected away from the other leg 10, so that all of the shoulders 14, 15 and 16 extend toward the brake shoe when the key is in position.

The terminal or free end 17 of the leg 10 preferably extends a distance beyond the terminal of the other leg 11, which latter terminal has a bearing relation with the leg 10. The extended free end 17 of the leg 10 is provided to facilitate the introduction of the key into the key-way and to constitute a leader for directing the lower end of the key through the key-way as the key is being driven into place. The extended terminal of leg 10 is preferably slightly deflected in a direction away from leg 11 to avoid its possibly catching in the key-way when the key is being driven in. Preferably both of the terminals of the legs 10, 11 are also tapered as shown.

Again referring to Fig. 4, the lug 12 is formed by bending the upper ends of the legs 10, 11, similarly, so as to provide rearward tongues or lips 18, 19, which are matched together and united as by rivets 18a. The uniting of the legs may also be done by welding or the like.

Referring now to Fig 1, the improved key is shown as driven for almost its full length, except for the projecting lug 12, into the key-way between the brake-shoe head 20 and the brake-shoe 21. A full inward drive of the key is permitted in many cases. It will be seen that the brake-shoe head is provided with a pair of members 22, 23 which are spaced apart and extend outwardly from the face of the brake-shoe head. A complementary projecting member 24 is provided on the back of the brake-shoe and fits into the space between the two projecting members 22, 23. Registering apertures 25 extend through the projecting members 22, 23 and 24, and constitute portions of the length of the key-way. Through these apertures the legs 10, 11 of the key are driven, with the result that the deflected portion 13 of the key bears upon corresponding walls of the projecting members 22, 23 while the leg 10 bears upon the corresponding wall of the projecting member 24 of the brake-shoe. Inasmuch as the inward driving of the key causes the resilient legs 10, 11 to yield, the leg 11 is flexed and bowed in opposite direction from its original set, thereby firmly pressing the leg 10 against the adjacent surface of the projecting member 24.

The threading of the key into the key-way will cause the shoulder 15 to further tend to flex both of the legs 10, 11 and to put them under greater tension, which tension is maintained by the extended bearing portion 13 of leg 11. When the key is thus in place, the shoulder 14 will be located between the projecting member 22 on the head 20 and a cross-piece 26 in the upper toe of the head 20, through which a part 28 of the key-way is formed. It will be seen that any considerable upward movement of the key and the jumping thereof out of place so as to disconnect the parts, is precluded by the abutment provided by the cross-piece 26, inasmuch as the shoulder 14 comes in contact therewith if the key moves upwardly, and thereby the removal of the key due to vibration of the parts is precluded.

It will be observed that in whatever way the improved spring key is contemplated it preferably has reversely bent portions which may bear in opposite directions upon the lugs 22, 23 of the head and the lug 24 of the shoe.

When the key is in place as in Fig. 1, it will be seen that the shoulder 16 at the free end of the leg 11 is located between the projecting member 23 of the head 20 and a cross-piece 27 which extends across the lower toe of the head 20, through which a portion 29 of the key-way passes. It will be seen that the free ends of the key are very close to the cross-piece 27, and would tend to bear upon the same if the construction of key shown in Figs. 6 and 7 is employed, and that if the key should move upwardly for a suitable distance due to vibration the shoulder 16 will be brought into abutting relation with the projecting member 23, thereby also assisting in preventing the displacement of the key, and maintaining the shoe 21 in locked relation to the head 20. If the key when in the position shown in Fig. 1 cannot readily be removed in the usual manner by engaging a lifting member under the rearwardly projecting lug 12 of the key, its removal can be assisted by driving upwardly upon the projecting lower end of the leg 10.

It will be readily seen that should the spring key be driven as far in as possible, the shoulder 16 will come into firm bearing relation with the member 27 forming part of the lower portion of the head, so that the key is completely under tension from end to end, inasmuch as it is in firm bearing relation with both ends of the head and also with the apertured lugs intermediately of such bearing points.

In Fig. 2 it is assumed that the condition between the head 20 and brake-shoe 21 is such as to preclude the full inward driving of the key. The variations which might bring this about are so numerous that they cannot be easily illustrated. In this view it will be seen that the bearing portion 13 presses in one direction upon the adjacent surface of the projecting member 22 and that the leg 10 bears in opposite direction upon the adjacent surface of the projecting member 24. It will also be seen that the shoulders 14 and 16 are in abutting relation with the cross-piece 26 and the projecting member 23 on the head 20, thereby preventing the key from jumping out of its place.

In Fig. 3 it is assumed that the conditions between the head 20 and the brake-shoe 21 are such that the key can only be driven in for a little more than one-half of its length. Here the deflected portion 13 of leg 11 bears upon the cross-piece 26, thereby tensioning the two legs 10, 11, while the shoulder 16 at the lower end of the leg 11 is in bearing relation with the projecting member 22 of the brake head. Also the lower end of the leg 10 is in bearing relation with the projecting member 24 on the brake-shoe.

Another desirable form of key is illustrated in Figs. 6 and 7. This includes a lug 30, the details of which are similar to those of the other form of the invention, but in Figs. 6 and 7 the two opposed legs 32, 33 are both originally bowed in the same direction, the lower terminal of the leg 33 bearing upon the leg 32. It will be seen that the curve of the bowed leg 32 is of less radius than the general curve of the leg 33, which condition is desirable when the legs are both bowed in the same direction, in order to take full advantage of the present improvements. In this form of the invention, the leg 33 is provided at its incurved surface with an extended longitudinal bearing portion 34 which is deflected in a direction away from the other leg 32. This will provide a bearing portion 34, corresponding with the similarly located bearing portion of the other form of the invention, together with shoulders 35, 36 at the ends of the bearing portion 34. Also, a shoulder 37 is provided between shoulder 36 and the terminal of the leg 33. Also, the free lower end 38 of leg 32 is extended as before stated beyond the terminal of the leg 33. Hence the construction of key shown in Figs. 6 and 7 possesses in a substantially similar manner the features of the other form of the invention. In driving the modified key into position, the leg 32 is flexed to a greater extent and the leg 33 to a less extent, if at all. It will be noted that the bearing portion 13 in the form shown in Figs. 4 and 5 and the bearing portion 34 of Figs. 6 and 7, are each deflected or upset outwardly in a direction away from the opposite leg or flexible member of the key and will have a full bearing upon the inner surfaces of the head lugs 22, 23, in the position of the key as shown in Fig. 1 and likewise upon the head lug 22 when the key is positioned as in Fig. 2. Incident to such deflection or upsetting of the said bearing portions 13 and 34 the upper end of the key is set or positioned in spaced relation to the upper part of the brake-shoe so as to clear the same in both applying the key and when it is in position. This means that there is no objectionable bearing relation or friction between the upper ends of the key and the shoe when the preferred constructions of key are employed, and hence full advantage may be had of the novel features of the entire key.

Referring to the front depression formed between the shoulders 15, 16 of Figs. 4 and 5, and the similar depression formed between the shoulders 36, 37, of Figs. 6 and 7, such depression serves two purposes. It allows one of the head lugs 22, 23 to be engaged therein in each position of the key in Figs. 2 and 3, so that a self-locking effect is established and permits one of the shoulders or upsets 16 or 37 to become effective. It also provides a distinct rear bearing portion of the length of the leaf or leg 11 or 33 so that when the key is fully applied as in Fig. 1 and compressed to the maximum of say one third or one-half of its expanded size, the directly opposite surface portion of the other leaf contacts throughout therewith and an extensive mutual bearing of the lower ends of the key is thereby provided which relieves the two leaves or legs from undue strain.

In both forms of the invention as shown the relative bowing out of the shoe engaging leg or leaf is greatest at a point approximately opposite the center of the depression formed by forwardly upsetting the other leg or leaf between the shoulders at each end of such depression, so that the shoe engaging leg or leaf will gradually curve along easy lines in both directions from the approximate mid-length thereof, with the result that a maximum degree of flexibility is provided without impairing the efficiency of the other features of the key in assisting in properly holding the shoe on the brake-head.

When the key is installed in using position, the intermediate portions of its legs or leaves should compress to about one-third of its expanded size without changing the efficiency of the intermediate forward depression or upset portion of the brake-head engaging leg or leaf, this being stiffened by the shoulders at each end of such depression.

To sum up some of the advantages of the flexible, non-vibrating and self-locking key described and illustrated, they may be stated as follows: The improved key will fit any head now in service, whether new or worn. It will fit into the key-way of the brake head constructed with the narrow key-way and cross-pieces or bars across the toe lugs thereof. It will fit not only the heads just mentioned, but will fit worn heads and brake-shoes. The improved key is designed not only to fit under all conditions mentioned herein, but to compress sufficiently to allow for a tight fit in any combination of brake-heads and brake-shoes. The improved key is intended to assure a tight fit at all times, to eliminate excess wear, and to take up through its expansion all natural wear as is occurs. Other advantages could be enumerated, but it is believed that these will suffice.

Obviously, some of the advantages inherent in the invention as shown and described are not necessarily present in a brake shoe key having two spring legs, as a key with a single leg may have those advantages and still be within the disclosure of the invention.

It is obvious that the invention as described and illustrated is susceptible of more or less modification without departing from the scope of the appended claims.

What I claim as new is,—

1. A brake-shoe key, including two legs of leaf-spring metal and means connecting the spring legs and holding them breadthwise one in advance of the other, one of the leaf legs having outward substantially parallel shoulders extending transversely of its breadth, and located in front of the other leg, and one of the shoulders located near the free end of such front leg while the other shoulder is located relatively near to the connecting means.

2. A brake-shoe key, including two legs of leaf-spring metal facing each other breadthwise, and means connecting the spring legs, one of the leaf legs having a longitudinally extending bearing portion of substantial length, deflected outwardly away from the plane of its breadth, and from the other leg.

3. A brake-shoe key, including two legs of leaf-spring metal and means connecting the spring legs, both legs curved in opposite directions substantially throughout their lengths in the plane which they mutually occupy, and one of the legs having at its outer curved side an outward shoulder located along the curve, at a point between the connecting means and the free end of such leg.

4. In combination, a brake head and a shoe having a key-way and inter-engaged apertured members, the apertures registering with one another, and a key in the key-way and passing through the apertures, and including two broad legs of spring metal relatively arranged breadthwise at different distances from the shoe, and means connecting the legs, one of the spring legs having an outward shoulder located towards the free end of such leg and beyond the apertured members.

5. In combination, a brake head and a shoe having a key-way and inter-engaged apertured members, the apertures registering with one another, an abutment member on the upper part of the head and interrupting the key-way, and a key in the key-way and passing through the apertures, and including two broad legs of spring metal relatively arranged breadthwise at different distances from the shoe, and means connecting the legs, one of the spring legs having outward substantially parallel shoulders extending transversely of its breadth and transversely of the head, one of the shoulders located between the abutment member and apertured members and the other shoulder downwardly beyond the apertured members.

6. In combination, a brake head and a shoe having a key-way and inter-engaged apertured members, the apertures registering with one another, and a key in the key-way and passing through the apertures, and including two broad legs of spring metal relatively arranged breadthwise at different distances from the shoe, and means connecting the legs, one of the spring legs having a longitudinally extending bearing portion deflected outwardly away from its breadth and from the other leg and pressing on the head.

7. In combination, a brake head and a shoe having a key-way and inter-engaged apertured members, the apertures registering with one another, an abutment member on the upper part of the head and interrupting the key-way, and a key in the key-way and passing through the apertures, and including two broad legs of spring metal relatively arranged breadthwise at different distances from the shoe, and means connecting the legs, one of the spring legs having a longitudinally extending bearing portion of substantial length deflected outwardly away from the other leg and toward the shoe, and pressing on the head, and also having an outward shoulder on said one leg located below the apertures.

8. A brake-shoe key, including two legs of leaf spring metal and means connecting the spring legs, both legs curved in the same direction in the plane which they mutually occupy, and one of the legs having at its outer incurved side an outward shoulder located between the connecting and the free end of such leg.

9. A brake-shoe key, including two legs of leaf-spring metal and means connecting the spring legs, both legs curved in the same direction in the plane which they mutually occupy, and one of the legs having at its outer incurved side a lengthwise bearing portion deflected outwardly therefrom and also an outward shoulder between such bearing portion and the free end of the leg.

10. A brake-shoe key, including two legs each of leaf-spring metal and means connecting them, both legs curved in the same general direction in the plane which they mutually occupy, and the leg which is curved outwardly away from the other leg having a curve of less radius than the curve of such other leg, both legs being flexible from end to end.

11. A brake-shoe key, including two legs of leaf-spring metal and means connecting them, both legs curved in the same general direction in the plane which they mutually occupy, and the leg which is curved outwardly away from the other leg having a curve of less radius than the curve of such other leg and extending beyond such other leg at its free end.

12. A brake-shoe key, including two legs of separately formed leaf-spring metal and a flat, rearward, lug connecting the spring legs and formed from the same metal, one of the leaf legs having an outward shoulder extending transversely of its breadth and located between the lug and the free end of such leg.

13. A brake-shoe key, including two legs of leaf-spring metal, and a flat, rearward, lug connecting the spring legs and formed from the same metal, one of the leaf legs having outward substantially parallel shoulders extending transversely of its breadth, and one of the shoulders located near the free end of such leg while the other shoulder is located relatively near to the lug, the other leg being rearward of the shouldered leg, and the lug and shoulders functioning respectively at the back and front of the key.

14. A brake-shoe key, including two legs of leaf-spring metal, and a flat, rearward, lug connecting the spring legs and formed from the same metal, one of the leaf legs having a longitudinally extending bearing portion deflected outwardly away from the other leg, the lug and bearing portion functioning respectively at the back and front of the key.

15. A brake-shoe key, the same being formed from leaf-spring metal, and comprising two legs which are mutually opposed broadside, and means connecting corresponding ends of the legs and serving as means for driving or withdrawing the key, the terminal of one leg bearing upon the other leg, and the terminal of such other leg extending beyond the bearing point to form a leader.

16. A brake-shoe key, including two legs of leaf-spring metal connected at one end, the legs being held breadthwise one in advance of the other, the forward leaf leg having shoulders at its opposite surfaces providing depressions in such surfaces, one of which depressions provides for a maximum compression of the rear leg and the other depression providing an interlocking depression at the forward surface of the front leg.

17. A brake-shoe key, including two legs connected at one end, one leg for engaging a brake-shoe head and the other for engaging a brake shoe for connecting them together so that the former leg may be located in front of the latter leg when the key is used, the former leg having an interlocking depression at its front surface for interlocking with a part of the head, and the latter leg being of spring metal compressible toward the former leg when the key is used.

18. A brake-shoe key, including two legs connected at one end, one leg for engaging a brake-shoe head and the other for engaging a brake-shoe for connecting them together so that the former leg may be located in front of the latter leg when the key is used, the former leg having an elongated depression facing towards the middle portion of the latter leg, and the latter leg being of rearwardly bowed spring metal compressible toward the former leg when the key is used.

19. A brake-shoe key, including two legs connected at one end, one leg for engaging a brake-shoe head and the other for engaging a brake-shoe for connecting them together so that the former leg may be located in front of the latter leg when the key is used, the former leg having a bearing portion for the free end portion of the latter leg, and which bearing portion is deflected rearwardly from the adjacent upper portion of such leg, and the latter leg being of rearwardly bowed spring metal compressible toward the former leg when the key is used.

20. A brake-shoe key, including two legs of leaf-spring metal and means connecting the spring legs and holding them breadthwise one in advance of the other, one of the leaf legs having an outward shoulder located between the connecting means and the free end of such leg.

21. A brake-shoe key, including a strip of leaf-spring metal formed substantially on a curve from end to end and having along its curved forward side a lengthwise bearing portion deflected outwardly therefrom and an outward shoulder between such bearing portion and one end of the strip.

22. In combination, a brake-head and a shoe having a key-way and interengaged apertured members, the apertures registering with one another, and a key including a length of spring metal extending breadthwise between the brake head and shoe, the key having intermediate reversely bent portions which are respectively in bearing relation with the apertured members of the head and with the apertured member of the shoe to place the key under tension, the upper and lower ends of the spring key being respectively in bearing relation with the upper and the lower ends of the brake head.

23. A brake-shoe key, including a strip of spring metal, of a length sufficient to pass through, and at both ends beyond, the connecting lugs of a brake-shoe and its supporting brake-head and such strip having an interlocking depression at its broad front surface for interlocking with a part of such a brake head, such depression being formed by a deflected length of the strip itself.

24. In combination, a brake-head and a shoe having a key-way and interengaged apertured members, the apertures registering with one another, and a key including a length of spring metal substantially co-extensive with the length of the key-way and extending breadthwise of the apertures, and having an outward shoulder formed integrally therewith and located towards the lower end thereof beyond the apertured members for engagement with a part of the head.

25. A brake-shoe key, including a strip of spring metal of a length sufficient to pass through, and at both ends beyond, the connecting lugs of a brake-shoe and its supporting brake-head, and such strip being bent to form an abrupt forward shoulder integral therewith, the shoulder projecting beyond side edges of the strip and located at a distance from the middle of the strip.

26. In combination, a brake-head and a shoe having interfitting attaching lugs provided with aligned openings, and a key for securing the shoe snugly on the head and including a length of spring metal of sufficient extent to pass through such lugs and beyond them, and the key having an outward shoulder formed integrally therewith, the upper end of the spring key being in bearing relation with the upper end of the brake-head and the shoulder being in bearing relation with the lower end of the brake-head.

CHARLES R. BUSCH.